US007088740B1

(12) United States Patent
Schmidt

(10) Patent No.: US 7,088,740 B1
(45) Date of Patent: Aug. 8, 2006

(54) DIGITAL FM RADIO SYSTEM

(75) Inventor: Michael Schmidt, Hollis, NH (US)

(73) Assignee: Bae Systems Information and Electronic Systems Integration INC, Nashua, NH (US)

( * ) Notice: Subject to any disclaimer, the term of this patent is extended or adjusted under 35 U.S.C. 154(b) by 901 days.

(21) Appl. No.: 10/032,235

(22) Filed: Dec. 21, 2001

Related U.S. Application Data

(60) Provisional application No. 60/257,498, filed on Dec. 21, 2000.

(51) Int. Cl.
*H04J 1/00* (2006.01)

(52) U.S. Cl. ....................................... 370/490; 370/343

(58) Field of Classification Search ................ 370/480, 370/485, 486, 487
See application file for complete search history.

(56) References Cited

U.S. PATENT DOCUMENTS

| | | | | |
|---|---|---|---|---|
| 5,428,610 | A | 6/1995 | Davis | |
| 5,473,290 | A | 12/1995 | Scomazzon et al. | |
| 5,524,051 | A | 6/1996 | Ryan | |
| 5,561,849 | A | 10/1996 | Mankovitz | |
| 5,581,576 | A | 12/1996 | Lanzetta et al. | |
| 5,584,051 | A * | 12/1996 | Goken | 455/68 |
| 5,734,780 | A | 3/1998 | Ichiura et al. | |
| 5,751,806 | A | 5/1998 | Ryan | |
| 5,949,796 | A | 9/1999 | Kumar | |
| 5,960,328 | A | 9/1999 | Kimura et al. | |
| 6,031,418 | A | 2/2000 | Fowler | |
| 6,088,577 | A | 7/2000 | Yang et al. | |
| 6,178,317 | B1 * | 1/2001 | Kroeger et al. | 455/296 |
| 6,252,965 | B1 | 6/2001 | Beard | |
| 6,256,303 | B1 | 7/2001 | Drakoulis et al. | |
| 6,295,362 | B1 | 9/2001 | Zhang | |
| 6,307,890 | B1 | 10/2001 | Dyson et al. | |
| 6,430,227 | B1 * | 8/2002 | Kroeger et al. | 375/260 |
| 6,600,908 | B1 * | 7/2003 | Chan | 455/150.1 |
| 6,925,489 | B1 * | 8/2005 | Curtin | 709/217 |

FOREIGN PATENT DOCUMENTS

| | | |
|---|---|---|
| WO | WO99/50980 | 10/1999 |

OTHER PUBLICATIONS

Anderson, John, Digital Radio=Death, About.com, Feb. 6, 2001.
Elving, Bruce, FM SCA—Subsidiary Communications Authorization or FM Subcarrier Information—also called subsidiary Communications Services (SCS), Apr. 17, 2001.
Vernon, Thomas, Mobile Technologies, How to Cope?, Radio Work Newspaper, Mar. 14, 2001.

* cited by examiner

*Primary Examiner*—Brian Nguyen
(74) *Attorney, Agent, or Firm*—Maine & Asmus

(57) ABSTRACT

The present invention is for a high quality digital FM radio system that utilizes the subcarrier band to generate digital audio signals. The hybrid FM radio system utilizes the subcarrier band to transmit the digital FM signals that are synchronized to the analog FM signals. The receiver processes both the analog and digital signals and a high quality FM signal results. The receiver may switch between the traditional analog signal and the higher quality digital signal automatically to present the best possible audio to the user.

19 Claims, 7 Drawing Sheets

DIGITAL FM RADIO SYSTEM

CROSS REFERENCE TO RELATED APPLICATIONS

This application claims priority under 35 U.S.C. Section 119 from a U.S. Provisional Patent Application Ser. No. 60/257,498 filed on Dec. 21, 2000, which is incorporated herein by reference for all purposes.

TECHNICAL FIELD OF THE INVENTION

The present invention pertains generally to the field of data communications and more particularly to a system utilizing the FM subcarrier bandwidth for improved audio performance.

BACKGROUND OF THE INVENTION

The radio frequency spectrum associated with FM broadcasting band ranges from 88 to 107 MHz, and subdivided into channels. There is a portion of bandwidth within each FM channel that is not required for transmitting the main FM station broadcast signal, and is generally under utilized. Those responsible for the FM stations have continuously tried to efficiently utilize all of their allotted frequency resource including this available excess bandwidth.

Under current Federal Communications Commission (FCC) rules, FM radio stations are each allocated a channel that is 200 kHz wide. United States FM radio stations are granted a license to operate an FM radio signal within an assigned range of frequencies called a channel. This range is substantially larger than the minimum range or bandwidth required for the main FM radio signal. Although a typical FM station is assigned a bandwidth of 200 KHz, the positive or one-sided baseband frequency spectrum is a 100 KHz bandwidth, and an FM station takes up to a maximum of 53 KHz for the main FM stereo broadcasting station, and less for a monoaural station. The remaining portion of the baseband signal from 53 KHz to 99 KHz, approximately 50% of the available FM channel spectrum resource, is not required for broadcasting the main FM station signal.

The present FM radio stations with an operating bandwidth of 100 kHz contains two audio channels. The main channel, known as FM stereo, is transmitted using an L+R and L−R technique to accommodate monoaural reception as well. This is the channel received on car radios and similar mediums. A secondary channel, or subcarrier, above the 53 KHz area is used for Muzak and other private audio broadcasts. In general, the subcarrier is an under utilized bandwidth.

A diagrammatic representation of an FM channel is shown in FIG. 1 showing the 100 kHz one-sided baseband frequency. For the signals operating between 88–107 MHz, there is a main channel from 0–15 kHz, which is the mono band (L+R). There is a 19 KHz stereo pilot signal and the stereo band is from 23–53 kHz, wherein the lower side band (LSB) spans 23–38 kHz, the upper side band (USB) spans from 38 kHz to 53 kHz, and the (L−R) is at 38 kHz. The subcarrier band extends from 53 kHz to 99 kHz.

Experiments in the FM subcarrier bandwidth has been ongoing for many years, used in a number of applications, and implemented in a variety of analog and digital communication schemes. For example, Muzak, is standardized music used in elevators and similar locals. Muzak uses a double side band AM modulation of a 67 KHz subcarrier to carry the subscription music.

Radio stations try to lease frequencies in the "excess" bandwidth to other users through various subcarrier based systems. One such service is known as Sub-Carrier administration (SCA), that has been used in the United States for many years for background music without commercial interruption, reading services for the blind, stock market information, and educational and religious applications, and paging services to name a few. U.S. Pat. No. 5,248,610 shows the subcarrier band employed for transmission of traffic information, while a paging scheme that employs the subcarrier band is disclosed in U.S. Pat. No. 6,088,577 to transmit voice pager data over the FM subcarrier band.

SCA has also been used for data transmission, having the ability to reliably support a data rate of 4,800 bits/second or higher. The FCC deregulated SCA service and stations are free-to carry SCA services without prior authorization, as long as all uses of the frequency are within the regulations imposed on the license holder.

In Europe, one FM subcarrier application is known as the Radio Data System (RDS) while in the U.S., it is known as the Radio Broadcast Data Service (RDBS). The RDS system has been implemented by the BBC on the BBC FM transmissions in England. Similar systems are available in several European countries, wherein these systems use an RDS subcarrier at 57 kHz that is modulated with data signals. The RDS system has a number of message group types. In these applications, a 57 KHz subcarrier is modulated using bipolar phase shift keying (BPSK) to carry a low speed digital data signal. A block and bit synchronization method as well as a simple linear block encoding for error detection and correction enable the system to function. The data rate for the RDS system is 1187.5 bits/second or approximately 11.4 groups/second, and the channel modulation efficiency of RDS is about 0.3 bps/Hz. RDS provides for additional functional features such as roaming, seeking and locking onto of FM stations transmitting RDS signals.

Since systems like the RDS system have broad coverage, a number of users can use a data channel on a pro-rata basis. RDS is a fairly robust digital subcarrier communication scheme because of the long baud interval, low subcarrier frequency, and narrow bandwidth. This schema has been adopted as an international standard and incorporates specification of the physical layer (the modulation and FM interface), the data link layer (error correction coding), and a network layer for service delivery.

RDS has been popular in European countries for transmitting traffic-related information to motorists while utilizing the existing FM radio broadcasting infrastructure. However, RDS has a slow data transmission rate and with the many function groups RDS is too slow for effective data transmission.

Due to the low data rate of RDS, another format called the Data Radio Channel (DARC) supports a higher data rate FM subcarrier service. DARC is also an international standards (EIA-794) and has several different modes of operation. The modes vary according to the amount of error correction coding (ECC) overhead applied to the data transmission. DARC is 16K bits per second minimum-shift keyed modulation of a 76K Hz subcarrier tone.

Another higher frequency system that is comparable to DARC is the Subcarrier Traffic Information Channel (STIC). This digital system uses a differentially encoded, quadrature phase-shift keyed modulation of either a 72.2K Hz of a 87.4K Hz subcarrier tone to deliver a 18,050 or 21,850 bps raw data rate. STIC also has a US standard (EIA-795) and also addresses the STIC standard addresses layers 1 through 4. STIC basically applies modern modem technology to a FM subcarrier system by using efficient convolutional coding, code concatenation and interleaving at the bit level to address channel impairments.

Several other higher speed subcarrier technologies have been developed with limited success, demonstrating the difficulty of the propagation environment to which FM subcarrier systems are subjected and the rather low efficiency of the current FM subcarrier systems.

In typical FM broadcasting, left and right stereo base band signals are low-pass filtered and combined to produce a composite stereo signal. The circuit that combines the left and right component signals and produces the composite stereo signal is called an exciter. The composite stereo signal is used to drive a FM modulator that modulates a carrier wave in accordance with the composite signal. The modulated carrier wave is then broadcast using a FM antenna as an analog signal.

Conventional systems generate the composite stereo signal using analog equipment. But, there are a many difficulties in generating the composite stereo signal in the analog format. For example, low-pass filtering and sub-carrier stereo modulation are complicated for an analog system and the analog filters introduce phase distortions and group delay distortions into the resulting signal.

There have been attempts at generating the stereo composite signal in a digital format and converting the signal to an analog signal for broadcasting. This is advantageous for radio stations as employ the digital methods of programming such as CD's, DAT and computer audio files. Using digital signal processing (DSP) with fast high precision A/D and D/A converters, a FM exciter using digital signal processing has better performance than the analog systems.

And, there have been attempts at generating the audio signal in a digital format, wherein the signal is broadcast in digital, termed Digital Audio Broadcasting (DAB). While producing superior audio quality, the radio receivers must be equipped to receive the DAB. The DAB is more comparable to streaming audio over the Internet than the conventional analog broadcasts. Radio receivers buffer the incoming signals and play back the buffered elements. In the US, there are several proposed systems including the In-Band On-Channel (IBOC) and the In-Band Adjacent Channel (IBAC). Most other countries are backing the Eureka 147 standard. The Eureka 147 system employs similar attributes but occupies a different section of the radio spectrum. More information about the IBOC methodology is described in U.S. Pat. No. 5,949,796.

Unfortunately, pure DAB systems will require every person to purchase a new radio receiver as the analog receivers do not process the digital audio signals. There are proposals for hybrid processing using both analog and digital broadcasting for a period to allow the consumers to transition to digital receivers.

While DAB standards have not yet been finalized and there is still uncertainty in the implementation, the benefits in quality, efficiency, ease and cost will eventually make some form of DAB a reality. And, with lower cost broadcast systems there will likely be an increased number of applications in the subcarrier band for various transmissions.

One implementation for a digital signal processing system of a digital FM exciter provides for the left channel to provide a left analog audio signal that becomes the left component of the composite stereo signal. Similarly, the right channel provides a right analog audio signal that becomes the right component of the composite stereo signal. The left and right analog signals are respectively processed by anti-aliasing filters. After filtering, the left and right signals are respectively converted from analog into digital signals by A/D converters. The converted digital signals are provided to a digital signal processor (DSP).

The DSP combines the left and right signals into a composite digital signal. More specifically, the DSP performs band limiting filtering, pre-emphasizing, left and right channel mixing, sub-carrier generation, sub-carrier modulation and Sin(x)/x compensation for the D/A converter. Additionally, the DSP provides soft level limiting, loudness signal monitoring for analog and digital automatic gain control, and spectrum analysis for optimized system control and operation.

The composite digital signal output by the DSP is then converted to an analog signal by D/A converter and filtered through low pass filter. The result is a composite analog base-band stereo signal that may be used to modulate a carrier wave which is then broadcast by an FM antenna.

The drawbacks of this system result from the fact that the D/A converter and the external analog FM modulator must be of the highest quality, and therefore are very expensive. The high quality processing achieved by the front end A/D converters and the DSP will be lost if the D/A converter and analog FM modulator cannot match the performance of the DSP.

There are many related patents, including U.S. Pat. No. 6,295,362 involves a digital FM signal generator that generates a modulated FM signal for broadcasting without the need for an analog modulator. There is a FM subcarrier system that multiplexes the Data Radio Channel (DARC) encoded source channels using an FM subcarrier.

As discussed, the use of digital inputs in the broadcasting system improves the efficiency and cost. In particular, the audio inputs can arrive in one of the many digital formats. One of the present popular audio formats is the Moving Picture Experts Group (MPEG) audio layer-3 (MP3) that is a technique for audio compression and is basically a standard way of compressing/decompressing digital multimedia such as music. The MP3 protocol compresses the sound signal into a small-capacity music file at the rate of 1:10 by applying the MP3 technique to be more convenient to save and to speed up the network transmission rate.

As MP3 is a compressed audio file format, it is one of the more popular audio formats on the Internet, due to the small size and near CD quality. MP3 is a method of compressing audio samples with minimal loss of quality, with compression of up to 12:1 having no loss of quality.

There are various MP3 encoders/decoders for converting between audio formats. MP3 provides various levels of quality depending upon the number of bits used for encoding. There are various levels of compression quality supported in the standard such as 96 kb/s, 128 kb/s, 160 kb/s . . . . in 32 kb increments. The higher the transmission rate the better the quality.

What is needed is a system to improve audio fidelity and enhance the quality of music. Such a system should capitalize on new technologies but be implemented within the bounds of the current radio community.

SUMMARY OF THE INVENTION

The essence of the present invention is a hybrid FM radio system that permits digital FM transmission and reception simultaneously with the current analog system and addresses the aforementioned problems. In a preferred embodiment the present invention utilizes the subcarrier band to transmit the digital FM signals that are synchronized to the analog FM signals. The receiver processes both the analog and digital signals and a high quality FM signal results. The receiver may switch between the traditional analog signal and the higher quality digital signal automatically to present the best possible audio to the user.

An object of the invention is a hybrid FM radio system providing a audio output, comprising a transmitter section transmitting an analog FM signal and a digital FM signal, wherein the digital FM signal is packetized and transmitted on a subcarrier band. There is a receiver section for receiving the analog FM signal and the digital FM signal, wherein the digital FM signal is decoded and converted to an analog output. Finally, there is a means for determining the audio output.

Another object is the hybrid FM radio system, wherein the digital FM signal is directly derived from a digital source, or derived from the analog FM signal. If the digital signal is derived from the analog FM signal, the system can further comprise an analog delay in the analog FM signal, wherein the analog delay is substantially equivalent to a cumulative time delay of processing the digital FM signal in the transmitter section and processing the digital FM signal in the receiver section.

A further object is the hybrid FM radio system, wherein the means for determining is a multiplexer that switches between the analog FM signal and the digital FM signal.

An additional object is the hybrid FM radio system, wherein the digital FM signal is packetized in an MP3 format, or wherein the digital FM signal is packetized in an non-MP3 format. And, the hybrid FM radio system, wherein the digital FM signal is independent An object of the invention is a hybrid FM radio system producing a quality audio output, comprising a transmitter section transmitting an analog FM signal and a digital FM signal, wherein the digital FM signal is packetized and transmitted on a subcarrier band. There is a receiver section for receiving the analog FM signal and the digital FM signal, wherein the digital FM signal is decoded and converted to an analog output. The system further includes a multiplexer connected to the analog FM signal and the digital FM signal, wherein a multiplexer output generates the audio output.

Yet a further object is the hybrid FM radio system, wherein the multiplexer switches between the digital FM signal and the analog FM signal. Alternatively, the multiplexer switches in response to a user input to select either of the digital or analog inputs, or an electronic determination that the digital input is a copy of the analog station, is being decoded without errors, and is synchronized with the analog signal.

An object of the invention is a hybrid FM receiver capable of receiving an analog FM signal and a digital FM signal, comprising an antenna for receiving the analog FM signal and the digital FM signal with a front end processing section and a FM demodulator. There is an analog FM receiver section connected to the FM demodulator with a means for analog processing. A digital FM receiver section is connected to the FM demodulator with a programmable receiver and a music processor, wherein the programmable receiver performs receiver digital signal processing and wherein the music processor performs music digital signal processing. There is a multiplexer connected to the analog FM signal and the digital FM signal, wherein a multiplexer output generates the audio output.

Another object is the hybrid FM receiver, wherein the programmable receiver includes a memory means for storing a receiver digital signal processing software, or wherein the programmable receiver has an external interface for downloading the receiver digital signal processing software.

An additional object is the hybrid FM radio system, wherein the music processor includes a memory means for storing a music compressor/decompressor (CODEC). The CODEC for the music or the receiver DSP can be downloaded using a RDS format.

A final object is the hybrid FM radio system, further comprising an output switch for switching between the analog format and the digital format, or comprising a mixer for mixing the analog format and the digital format to produce the audio output.

Still other objects and advantages of the present invention will become readily apparent to those skilled in this art from the detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

In summary, the present invention refers to a hybrid digital FM radio system that utilizes the subcarrier band to transmit high quality digital audio in an easily accessible format. While the present application describes an MP3 audio compression format, other formats have been contemplated and it would be obvious to one skilled in the art to utilize other formats.

Figure 1:
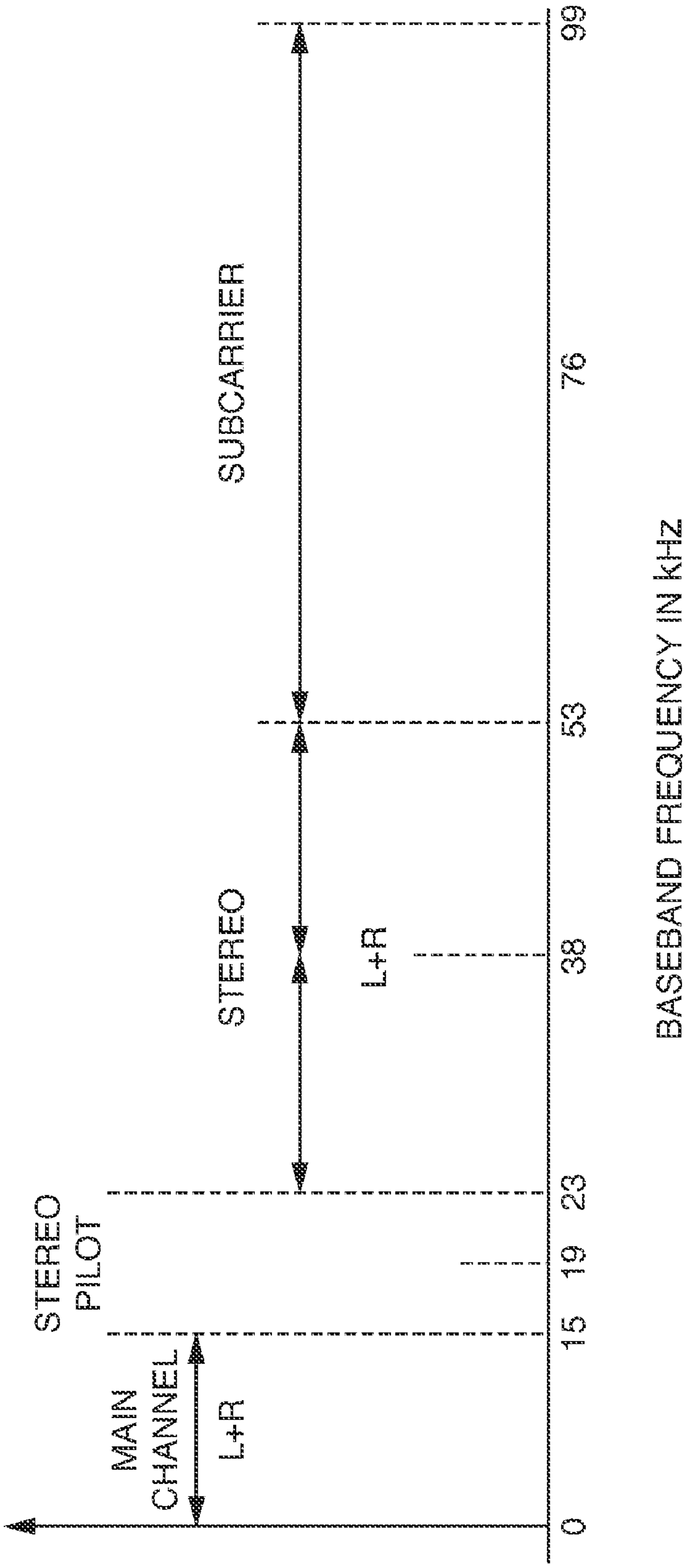
FIG. 1 illustrates the positive or one-sided baseband frequency spectrum of a 100 KHz bandwidth for FM.
Figure 2:
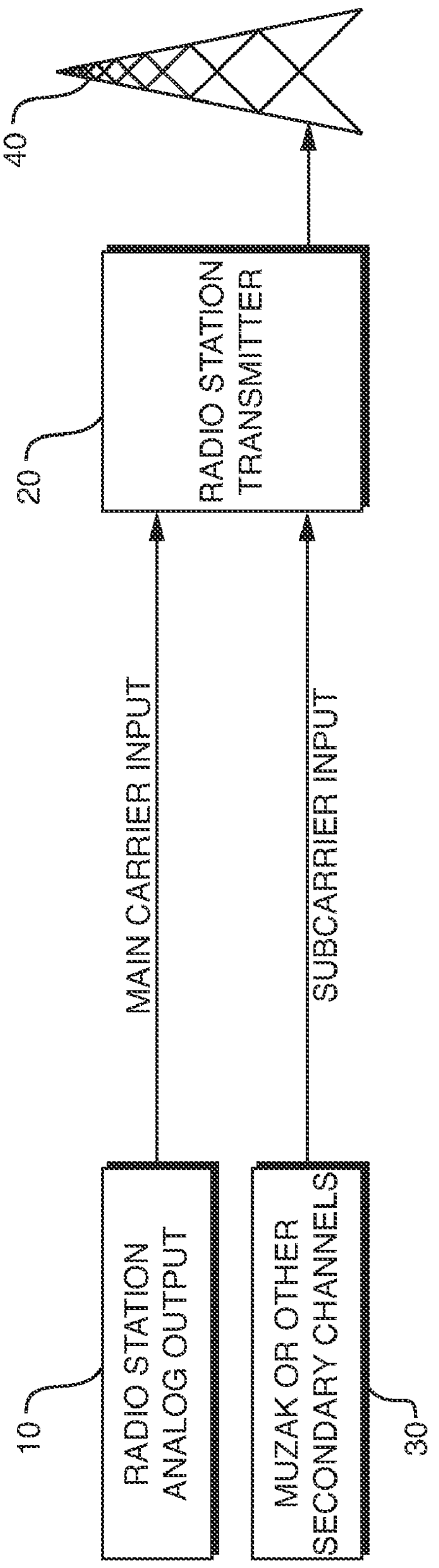
FIG. 2 (PRIOR ART)
FIG. 2 is a prior art block diagrammatic representation of a typical FM transmission system.

FIG. 2 shows the basic building blocks for a typical prior art FM radio station. There are two inputs to the transmitter, one for the traditional FM stereo, and one for an optional Muzak or other secondary channel in the subcarrier band.

The radio station 10 provides an analog output that is transmitted to the radio station transmitter 20 as the main carrier input. A subcarrier signal such as Muzak is separately generated and is the subcarrier input to the radio station transmitter 20. In general, the main carrier and subcarrier signals were unrelated and not synchronized. The transmitter 20 transmits the respective signals through the antenna 40.

Figure 3:
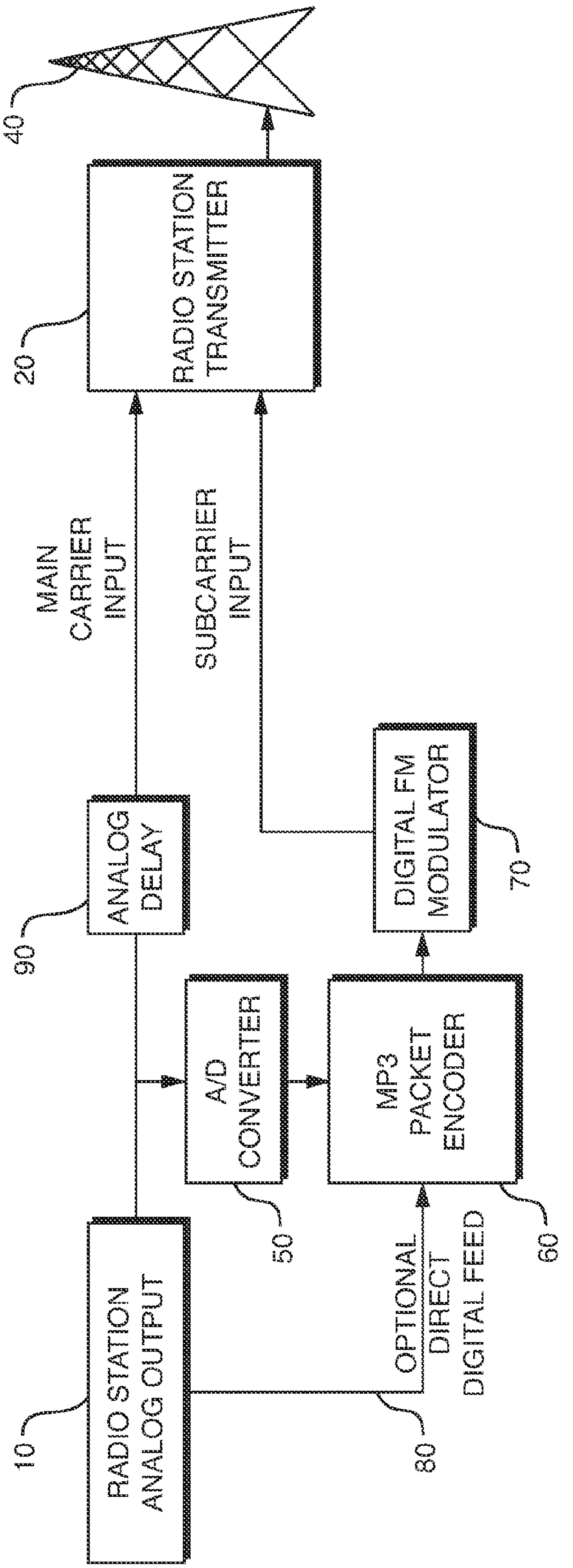
FIG. 3 shows an embodiment of a hybrid FM transmission system for generating the standard analog FM output and a high quality digital output in the subcarrier band

The radio station for the hybrid digital FM broadcasting system of the present invention is shown in FIG. 3. The radio station 10 still generates the analog system for the main carrier input to the transmitter 20. This would enable standard analog reception without the requirement to purchase digital receivers or modify existing equipment.

The analog output from the radio station 10 is also converted into a digital form via an A/D converter 50. The digital output of the A/D converter 50 is input to an MP3 packet encoder 60 for encoding the audio signal into the MP3 format. The output of the MP3 encoder 60 is processed by a digital FM modulator 70 that adds the forward error correction and trellis codes to the data for transmission, much the way a common computer modem would, before being transmitted to the transmitter 20 as a subcarrier input.

In another embodiment, there may also be a direct digital feed 80 from the radio station 10 instead of using the analog output and the A/D converter 50. The direct digital data goes directly to the encoder and is similarly processed, but avoids having to convert the data from an analog to digital format. As it is likely that the stations are transitioning to digital mediums, it will be more likely that the data will be arriving in a digital form from a CD, DAT, and/or computer files. An additional digital form of data can be Internet based and have the digital data arrive from the Internet and be directly fed to the MP3 packet encoder. The data can even arrive in MP3 format requiring only limited processing to include the sync information.

The MP3 Packet encoder 60 is responsible for breaking the music and voice digital data from the A/D converter 50 into packetized MP3. As is known in the art, the packet is a data stream having a header section with certain packet information, such as size, control codes and sync data along with the rest of the packet. The packet is the digital data stream that represents a portion of an audio signal. The MP3 compression technique allows for a user that may tune into a station in the middle of a song. Thus, the compression technique allows listening starting at any point in the stream and syncing up within a second or two. This is done by the packetizing of the data stream into segments of that length with identifiable synchronization points between them. The same restriction is true for the error correcting code scheme.

It should be apparent that the high quality digital system can operate independently of the analog FM system and would not require any A/D conversion or synchronizing of the analog and digital signals. In the independent embodiment, there can be a direct digital feed 80 to the MP3 packet encoder 60 and the subcarrier input would be an independent transmission.

Another embodiment links the analog and digital signals so that the output audio is the same for both the analog and digital techniques. In this mode, the MP3 engine 60 attaches several control codes into the data stream for use in the decoder on the receiving end. One code gives the time relationship between the analog and digital data streams. This allows for switching back a forth between analog and digital and keeping the two channels time phased together. Another control code indicates whether the digital channel is a copy of the analog channel or whether to automatically attempt to switch to digital mode.

In order to have the decoded digital waveform time synchronized with the analog waveform, the analog signal from the station 10 should include an analog delay 90 equal to the amount of time it takes the digital waveform to be coded at the and processed on the transmitter end and decoded at the and receiver end. Although this could be done at either the transmitter side or the receiver side, it is less expensive to implement at the transmitter end. The processing time should be a constant and the cumulative time entered as the analog delay 90.

Although not a necessity, there may be applications that have an older radio and a new digital radio operating in close proximity, and it is preferred to have the analog and digital radio time synchronized. Thus, in a preferred embodiment it is desirable to delay the analog signal at the transmitter end and there are a number of traditional analog delay techniques.

Figure 4:
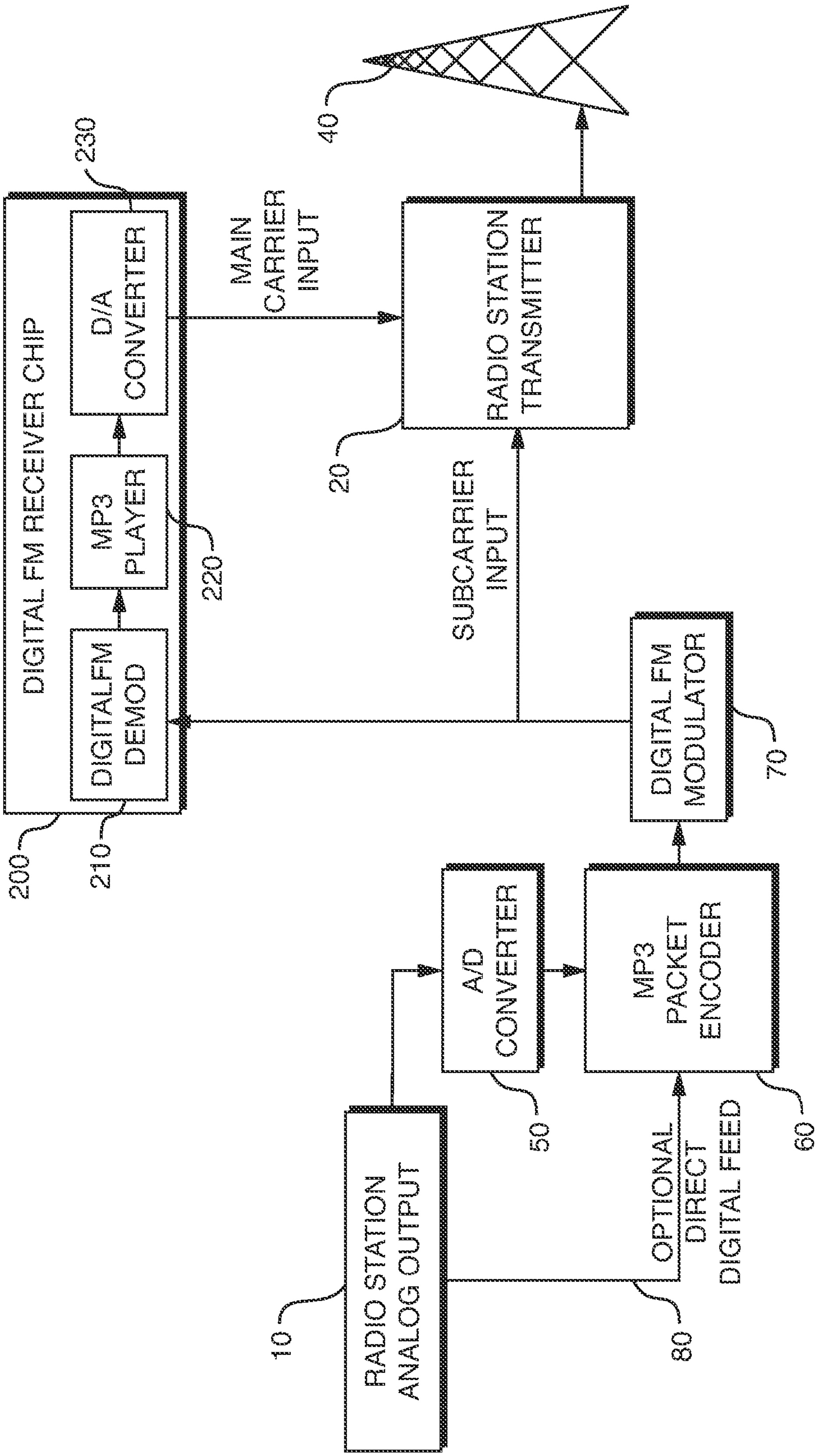
FIG. 4 illustrates an embodiment of the transmitter section with the analog delay provided by adding the receiver components.
Figure 5:
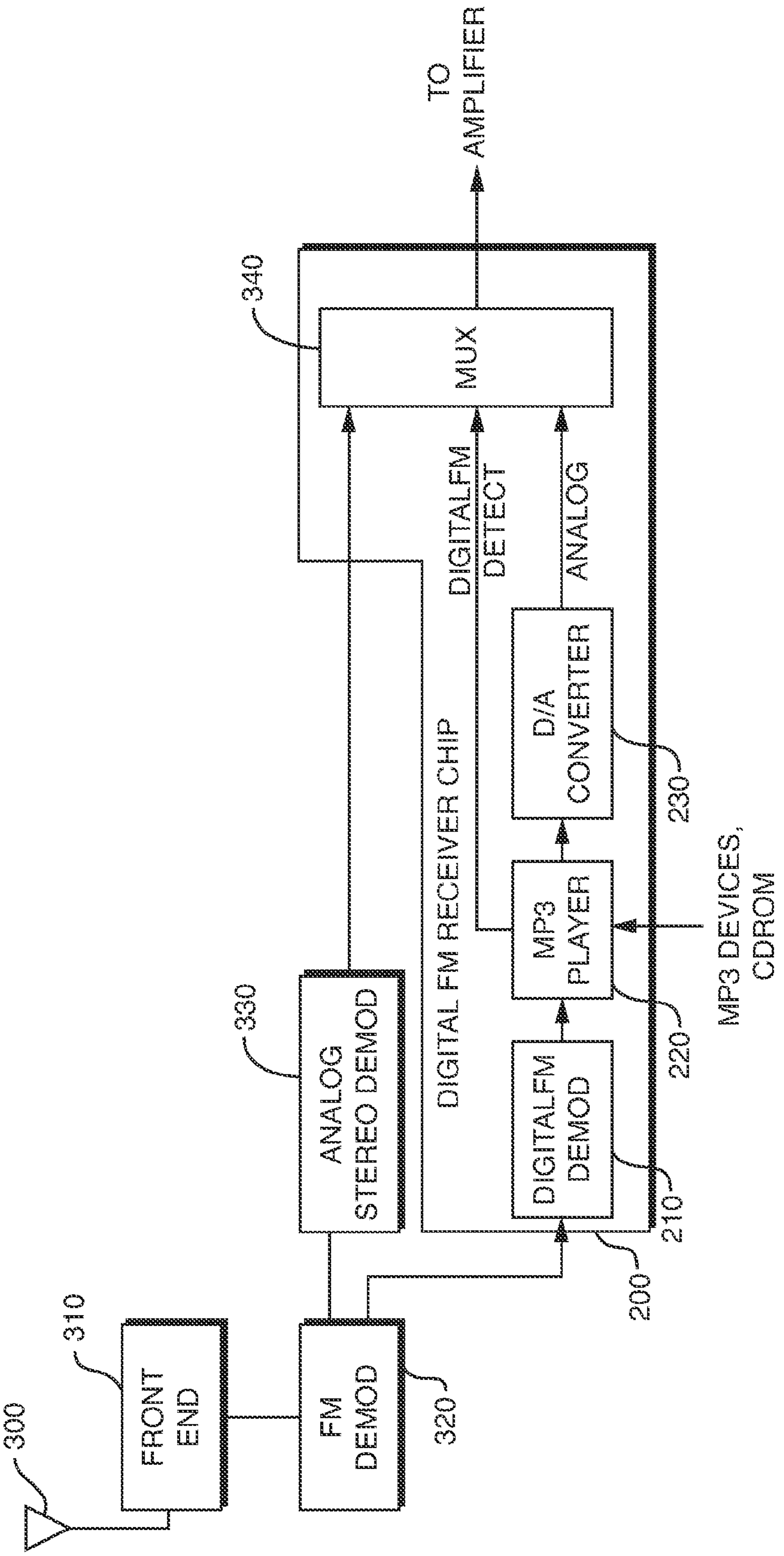
FIG. 5 shows the block diagrammatic view of the digital FM receiver section.

An alternate embodiment to incorporate the delay is to replicate the elements of the receiver end in the transmitter end as the delay as shown in FIG. 4. In this embodiment the main carrier input is extracted by taking the digital subcarrier output already having the processing delays from the transmitter end elements and making the subcarrier output the input to the FM receiver circuit. The digital FM receiver circuit 200 encompasses a digital FM demodulator 210, an MP3 player and a D/A converter 230. Incorporating the same elements ensures that the delays between the analog main carrier input and the digital subcarrier input have exactly the same delays. Processing the analog delay in this fashion does filter the analog signal to MP3 bandwidths that might result in a minor signal quality loss, however, the channel performance of the analog channel is so poor, that those affects are negligible.

An embodiment of a hybrid receiver is constructed that allows the traditional analog FM stereo to be received as well as the new high audio quality digital FM stations. A digital FM receiver section 200 is added to an existing analog receiver system to process the subcarrier FM signal. The antenna 300 picks up the signals that are fed to the front end 310 that performs basic pre-processing. The analog main carrier and digital subcarrier signals are subject to a FM demodulator 320 and the analog main carrier is processed by the analog stereo demodulator 330 with the resulting FM signal connected to a multiplexer 340. The digital subcarrier signal from the FM demodulator 320 is processed by the digital FM receiver section 200. The digital section is processed by the digital FM demodulator, the MP3 player/decoder to generate the digital audio output which is then connected to a D/A converter 230 to generate the analog signal that is also connected to the multiplexer 340. Two D/As may be necessary to create the left and right channels. Alternatively, an embodiment may choose to create a L+R and L−R and connect it earlier in the audio path of the radio. The MP3 decoder extracts the header information from the packet, which sets the digital FM detect that is used to control switching between digital and analog reception with the resultant signal sent to the amplifier (not shown).

Enough time should be allotted in the analog time delay to accommodate slow receiver DSP hardware or SW. This also allows a receiver to instantly play the traditional analog signal while the user switches through the channels to find the station he/she would like to listen to. The receiver may then cut in the higher quality digital version of the station at the next available synchronization point. All the user notices is that his music sounds better after being tuned to a particular station for a small number of seconds.

The digital FM demodulator 210 extracts the data stream, 160 Mb/S in a preferred embodiment, from the channel subcarrier, which involves locking in on the datastream, decoding the trellis codes and performing the error correction function. Such processing also involves addressing multipath problems that negatively impact reception characteristics.

The MP3 engine not only performs the decoding functions and extracting the packetized data into a data stream, but allows external connections. Other MP3 devices or digital devices, such as CD's or DAT's are permitted. And, there can be an Internet hook-up with a connection to a legitimate peer-to-peer audio database or other audio collection allowing a radio station to operate with few or no physical recording. These other devices can utilize the MP3 engine so as not to require adding any additional MP3 hardware. The multiplexer 340 in the circuit allows either the original FM stereo or new digital FM stereo to be sent to the amplifier (not shown).

Figure 6:
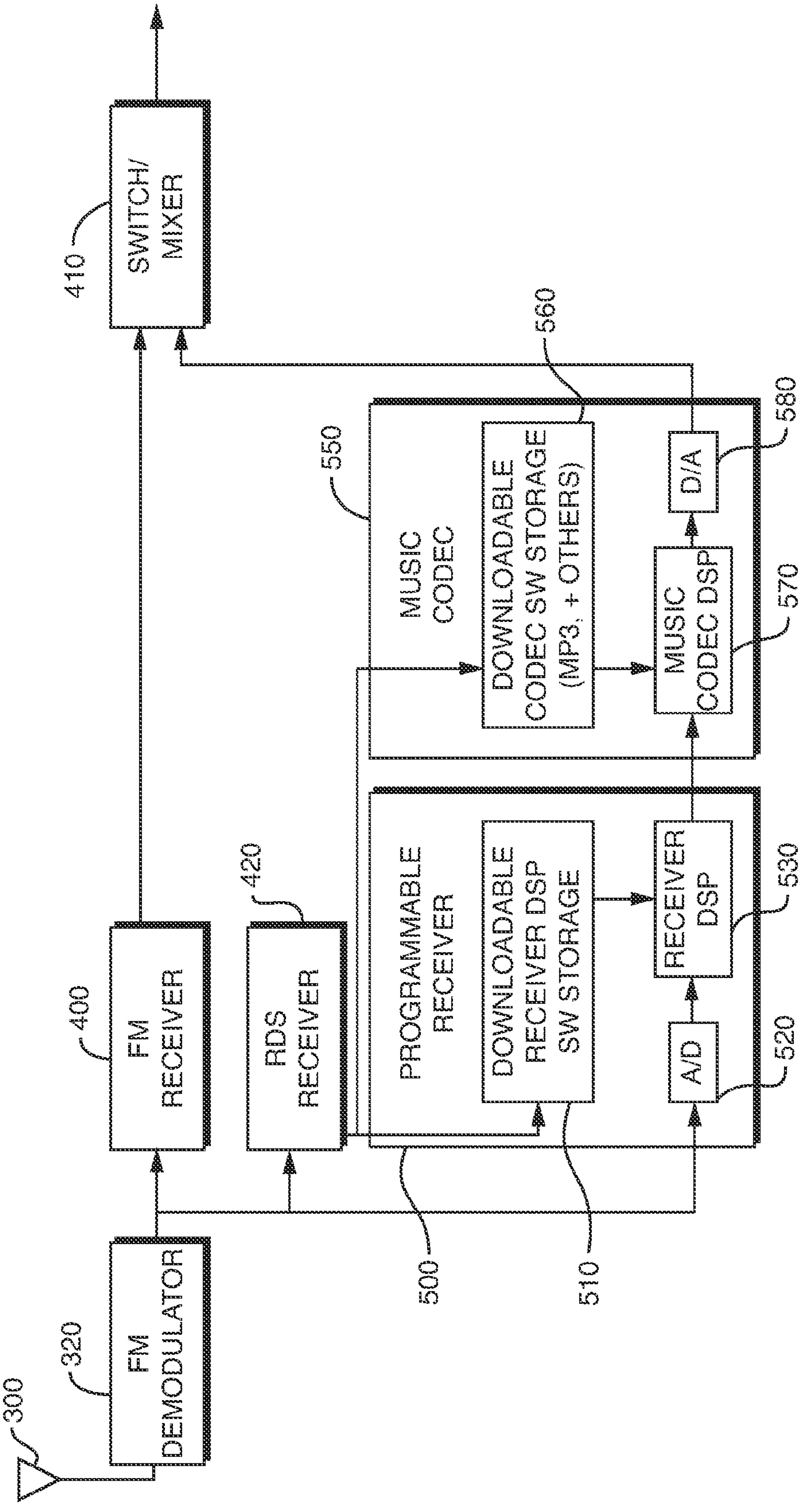
FIG. 6 represents a receiver section for processing the analog FM signal and the digital subcarrier FM signal FIG. 7 timing waveforms showing the synchronization of the analog and digital FM signals

Referring to FIG. 6, illustrating another embodiment of the digital FM receiver end. The antenna receives the analog FM signal and the digital FM signal which are both processed by the FM demodulator. The main carrier analog FM signal is processed by the FM receiver 400 and the output is connected to the switch/mixer 410. The digital subcarrier signal connects to an RDS receiver 420 that connects to a programmable receiver 500 and a programmable music compression/decompression (CODEC) 550. The programmable receiver 500 encompasses a downloadable receiver software storage section 510 used to maintain the receiver DSP for the particular receiver CODEC. The receiver storage section 510 maintains one or more CODEC's depending upon memory capacity, but can also connect to disc drives and the Internet to obtain other receiver CODEC's. The CODEC storage may contain factory programmed CODEC's and/or be able to download over an RDS link from the selected radio station, or by other means. The receiver storage is interconnected to the receiver DSP section 530 that processes the data using the appropriate CODEC. The receiver DSP section 530 also has an input from the FM demodulator 320 which is converted by the A/D converter 520.

When the receiver is tuned to a particular radio station, it looks in the RDS control information to determine whether it has the right transmission modulation decode CODEC already in its storage to decode the SCA waveform. If it does, it starts to decode waveforms into digital packets and send the decoded data bits to the audio/music CODEC. If a demodulation CODEC does not exist for that station in memory, the CODEC will be downloaded over the RDS link that may either run time interleave with the SCA digital data, or frequency interleave within that same SCA channel. In this case, it may take several seconds for the CODEC to be downloaded before the digital receiver becomes operational.

The digital signal from the RDS receiver 420 also connects to a music CODEC 550. The music CODEC 550 comprises a storage section 560 for storing one or more music CODEC's, with means for obtaining other CODEC's either from disc drives, networking or via the Internet. MP3 is an example of a music CODEC. The output of the programmable receiver 500 is an input to the music CODEC DSP 570, and the processed signal is converted by the D/A converter 580 to an analog input to the switch/mixer 410.

Much like the demodulation CODEC, the radio will look at data from either the RDS link or from the packet headers them selves to determine what type of audio/music CODEC is required. If the CODEC is already resident in the audio/music CODEC storage, the data is then immediately decoded into audio at the next synchronization point. If the CODEC is not present, it is downloaded via the RDS link or by other means. This will cause a small delay in the start up of the digital quality audio due to the time it takes to download the CODEC.

It is envisioned that most radios will have enough memory to store most if not all the demodulation and audio/music CODECs in a given geographic area, and CODECs will infrequently need to be downloaded. Downloads of new CODECs may needed to support CODEC upgrades, bug fixes, or new CODECs as encoding technology improves.

One embodiment of this may include sharing of the CODEC storage area between the Demodulation and audio/music storage needs.

The switch 410 allows the receiver to operate solely in analog or digital mode, and can further function as a mixer to combine digitally processed data with the analog signal.

A digital FM detect signal can be provided from the audio/music CODEC (MP3) player engine to indicate "good" digital FM is received and used to instruct the multiplexer to choose the digital reception. That digital signal flag can determine the state of the output multiplexer, although other codes and overrides are within the scope of the invention.

In one embodiment the digital signal flag is 'true' if there are no uncorrectable errors from the error correction engine, a valid sync flag was recently processed, and the packet decodes in the MP3 player operated properly. If the MP3 player indicates a good link, and it is recognized as a copy of the analog station, the multiplexer is automatically switched to the digital channel. The switch from digital to analog is transparent to the user, wherein the user only notices an improvement in the quality of the sound, and perhaps a digital FM indicator is presented on the display. Thus, this is transparent to the user. As most FM radio is listened to in cars, it is important not to increase the user workload.

The entire receiver implementation should only add one chip to the design of the average car or home radio. Plus, it does not disturb the existing infrastructure of analog FM radio. Only minor additional hardware need be added to the radio stations as well. That should allow rapid acceptance of the system. FM Stations will want to upgrade their system with better quality sound as it will increase listeners and attract more advertising dollars.

Figure 7:
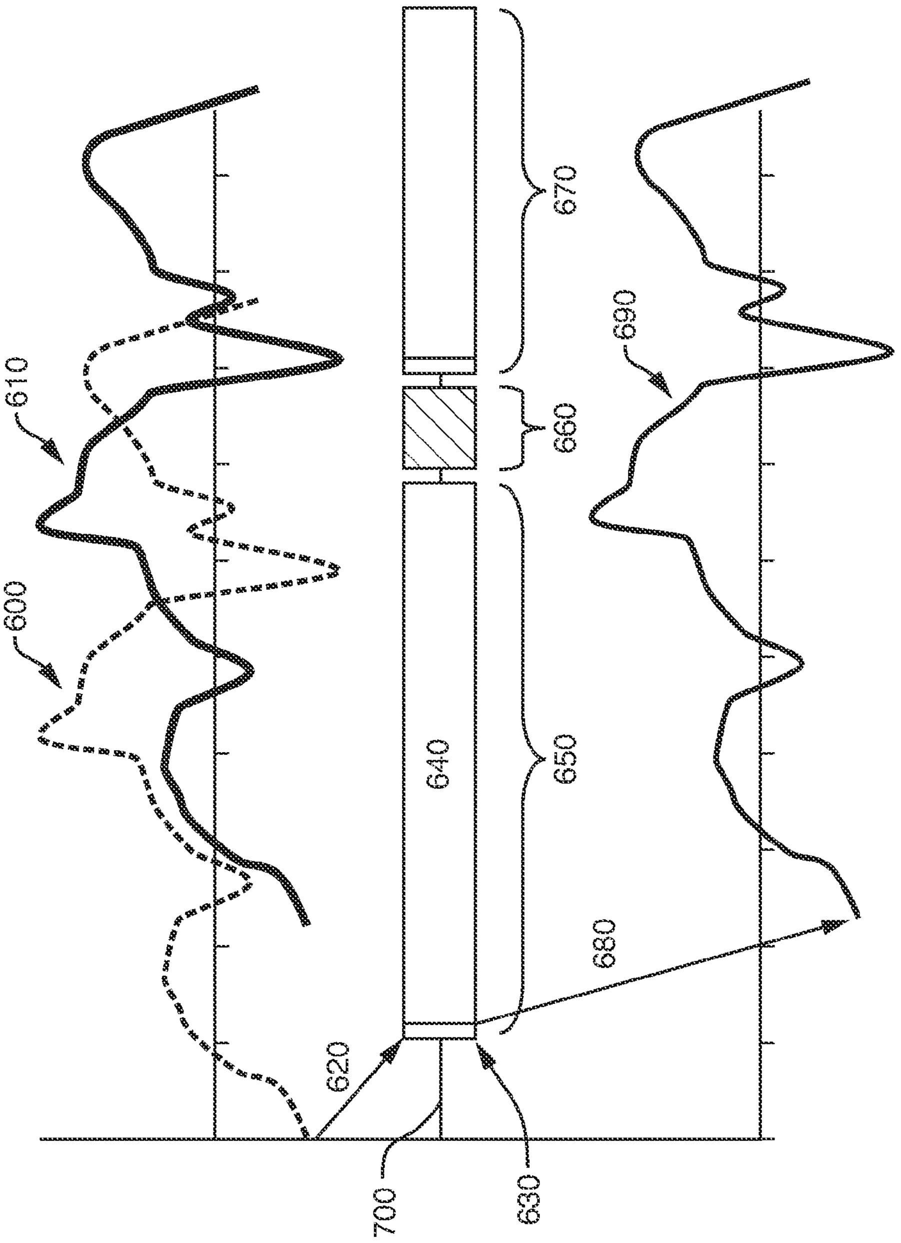

Referring to FIG. 7, the waveforms illustrate the synchronization scheme for matching the analog and digital signals. The original analog FM signal 600 is depicted along with the delayed analog signal 610 from the transmitter. The amount of delay is equal to the time allotted for the transmitter to encode and transmit first bit of the packet plus the time allotted for the receiver to decode first bit of packet. There is sufficient margin in the system implementation to accommodate slow decoders. The time delay 620 is the time difference between the analog signal to the transmitter putting out the packet synchronization flag, wherein the synchronization flag in the header and is used as part of the processing to determine a valid digital packet. The MP3 header 630 contains various data including the time synchronization bit and MP3 header data. The data section of the MP3 packet 640 contains the digital representation of the audio signal, and the combined header and data section constitute the entire MP3 packet 650. The RDS time interleaved packet 660 is used for CODEC download and other control and separates the packets 650 and 670. The time difference 680 represents the time allotted for the receiver to decode the packet start and output the first bit. High quality analog signal 690 is created by the receiver MP3 CODEC with the time correlated to the transmitted analog signal. A radio may switch between the transmitted analog and the decoded digital version with no perceptible audible time delays. The data transmitted on the SCA channel 700, includes the RDS control and encoded FM radio data The system may switch from the transmitted analog signal to the decoded digital version of the station at the given synchronization points at the start of the packet. This way, the user can start to listen to transmitted analog station immediately, and have the high quality version of the station cut in automatically at the next synchronization point.

A series of field tests have proven that the subcarrier can be used to transmit digital information in the subcarrier band up to 160 kb/S reliably. Field trials determined that there was no significant spillover into the adjacent FM analog audio bands that would cause a reduction in audible quality of adjacent analog stations. The field testing included mobile testing to determine the performance in dynamic multipath environments. In one embodiment, a trellis type coding technique was used with forward error correction similar to modern telephone modems. There are numerous applications that benefit from this digital data link and the dramatic improvements in sound quality indicate a significant commercial opportunity.

One embodiment is to encode very high quality audio onto a digital channel. The audio could be a separate channel from the FM Stereo in that same band, or be a higher quality version of the same FM stereo radio station. With a 160 kb/S channel bandwidth, one needs to compress the audio track to fit in that bandwidth. There are multiple compression standards that one could use to do that. Using MP3 seems a logical choice based on its commercial acceptance. An MP3 channel can achieve good quality sound at 128 Kb/S. This fits in the 160 kb/S channel with room for sync pulses and error correction coding.

The objects and advantages of the invention may be further realized and attained by means of the instrumentalities and combinations particularly pointed out in the appended claims. Accordingly, the drawing and description are to be regarded as illustrative in nature, and not as restrictive.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

What is claimed is:

1. A hybrid FM radio system providing an audio output, comprising:

a transmitter section transmitting an audio transmission as a standard analog FM signal and a digital FM signal, wherein said digital FM signal is packetized and transmitted on a subcarrier band, and said analog FM signal transmitted on a main carrier band;

a receiver section for receiving said analog FM signal and said digital FM signal, wherein said digital FM signal is decoded and converted to a digital decoded analog FM output and said analog FM signal is processed to provide a standard analog FM output, and wherein said standard analog FM output and said digital decoded analog FM output are synchronized; and a means for automatically determining said audio output from said digital decoded analog FM output and said standard analog FM output.

2. The hybrid FM radio system according to claim 1, wherein said digital FM signal is directly derived from a digital source.

3. The hybrid FM radio system according to claim 1, wherein said digital FM signal is derived from said analog FM signal.

4. The hybrid FM radio system according to claim 3, further comprising an analog delay in said analog FM signal, wherein said analog delay is substantially equivalent to a cumulative time delay of processing said digital FM signal in said transmitter section and processing said digital FM signal in said receiver section.

5. The hybrid FM radio system according to claim 1, wherein said means for determining is a multiplexer that switches between said standard analog FM output and said digital decoded analog FM output.

6. The hybrid FM radio system according to claim 1, wherein said digital FM signal is packetized in an MP3 format.

7. A hybrid FM radio system producing a quality audio output at a receiver, comprising:

a transmitter section transmitting an analog FM signal and a digital FM signal, wherein said digital FM signal is packetized and transmitted on a subcarrier band;

a receiver section for receiving said analog FM signal and said digital FM signal, wherein said digital FM signal is decoded and converted to an analog output;

a multiplexer connected to said analog FM signal and said digital FM signal, wherein said multiplexer switches in response to parameters selected from the group consisting of: a user input, a determination that said digital FM signal is a copy of said analog FM signal, a status determination that said digital FM signals is decoded without errors, and a synchronization determination that said digital FM signal is synchronized with said analog FM signal; and wherein a multiplexer output generates said audio output.

8. The hybrid FM radio system according to claim 7, wherein said multiplexer automatically switches between said digital FM signal and said analog FM signal.

9. The hybrid FM radio system according to claim 7, further comprising an analog delay in said analog FM signal, wherein said analog delay is substantially equivalent to a cumulative time delay of processing said digital FM signal in said transmitter section and processing said digital FM signal in said receiver section.

10. The hybrid FM radio system according to claim 7, wherein said digital FM signal is packetized in an MP3 format.

11. A hybrid FM receiver capable of receiving an analog FM signal and a digital FM signal and producing an audio output, comprising:

an antenna for receiving said analog FM signal and said digital FM signal with a front end processing section and a FM demodulator;

an analog FM receiver section connected to said FM demodulator with a means for analog processing;

a digital FM receiver section connected to said FM demodulator with a receiver processor and a music processor, wherein said receiver processor performs receiver digital signal processing and wherein said music processor performs music digital signal processing; and a multiplexer connected to said analog FM signal and said digital FM signal, wherein a multiplexer output generates said audio output.

12. The hybrid FM receiver according to claim 11, wherein said receiver processor includes a memory means for storing a receiver digital signal processing software.

13. The hybrid FM receiver according to claim 11, wherein said receiver processor is programmable and has an external interface for downloading a receiver digital signal processing software.

14. The hybrid FM receiver according to claim 13, wherein said receiver digital signal processing software is downloaded using a radio data system (RDS) format.

15. The hybrid FM receiver according to claim 11, wherein said music processor includes a memory means for storing a music compressor/decompressor (CODEC).

16. The hybrid FM receiver according to claim 15, wherein said music processor is programmable and has an external interface for downloading said music CODEC.

17. The hybrid FM receiver according to claim 11, further comprising an output switch for switching between said analog FM signal and said digital FM signal.

18. The hybrid FM receiver according to claim 11, further comprising a mixer for mixing said analog FM signal and said digital FM signal to produce said audio output.

19. The hybrid FM receiver according to claim 11, wherein said digital FM signal is packetized in an MP3 format.

* * * * *